United States Patent
Takijiri et al.

(10) Patent No.: US 10,234,884 B2
(45) Date of Patent: Mar. 19, 2019

(54) POWER SUPPLY APPARATUS OF FLUID CONTROL AND MEASUREMENT SYSTEM

(71) Applicant: HORIBA STEC, Co., Ltd., Kyoto-shi, Kyoto (JP)

(72) Inventors: Kotaro Takijiri, Kyoto (JP); Hiroshi Takakura, Kyoto (JP); Kenichi Oe, Kyoto (JP)

(73) Assignee: HORIBA STEC, Co., Ltd., Kyoto-shi, Kyoto (JP)

( * ) Notice: Subject to any disclaimer, the term of this patent is extended or adjusted under 35 U.S.C. 154(b) by 620 days.

(21) Appl. No.: 14/738,366

(22) Filed: Jun. 12, 2015

(65) Prior Publication Data

US 2015/0362939 A1    Dec. 17, 2015

(30) Foreign Application Priority Data

Jun. 13, 2014  (JP) ................................. 2014-122060

(51) Int. Cl.
| | |
|---|---|
| *G05B 19/04* | (2006.01) |
| *G05F 1/66* | (2006.01) |
| *G05D 7/06* | (2006.01) |
| *G05B 19/042* | (2006.01) |

(52) U.S. Cl.
CPC ............. *G05F 1/66* (2013.01); *G05D 7/0641* (2013.01); *G05B 19/0425* (2013.01)

(58) Field of Classification Search
CPC ................................................ G05B 19/0425
USPC ....................................................... 700/282
See application file for complete search history.

(56) References Cited

U.S. PATENT DOCUMENTS

| | | |
|---|---|---|
| 8,461,953 B1 | 6/2013 | Ward |
| 2005/0267446 A1 | 12/2005 | Cucin |
| 2010/0094471 A1* | 4/2010 | Lowery .............. G05B 19/0425 700/282 |
| 2010/0145633 A1 | 6/2010 | Yasuda |
| 2010/0258534 A1 | 10/2010 | Hughes |
| 2012/0080944 A1 | 4/2012 | Recker et al. |

FOREIGN PATENT DOCUMENTS

| | | |
|---|---|---|
| CN | 101563663 A | 10/2009 |
| CN | 101853034 A | 10/2010 |
| CN | 102906583 A | 1/2013 |

(Continued)

OTHER PUBLICATIONS

Japanese Patent Office, Office Action Issued in Japanese Patent Application No. 2015-091076, dated Feb. 16, 2016, 3 pages.

(Continued)

*Primary Examiner* — Jason Lappas
(74) *Attorney, Agent, or Firm* — Alleman Hall Creasman & Tuttle LLP (57) ABSTRACT

In order to prevent an increase in size of a power source device in a power supply apparatus adapted to manage multiple flow rate controllers, the power supply apparatus is connected via cables to the multiple flow rate controllers adapted to control fluid flow rates, and manages operations of the flow rate controllers via the cables as well as supplying power to the flow rate controllers, respectively. In addition, the power supply apparatus is configured to include a power supply control part that shifts power supply start timings for at least some of the flow rate controllers.

7 Claims, 4 Drawing Sheets

(56) References Cited

FOREIGN PATENT DOCUMENTS

| JP | H05244722 A | 9/1993 |
|---|---|---|
| JP | 11225429 A | 8/1999 |
| JP | H11243640 A | 9/1999 |
| JP | 2001037071 A | 2/2001 |
| JP | 2003164062 A | 6/2003 |
| JP | 2009089529 A | 4/2009 |
| JP | 2009259235 A | 11/2009 |
| WO | 2008069227 A1 | 6/2008 |

OTHER PUBLICATIONS

Japanese Patent Office, Office Action Issued in Application No. 2015091076, dated Jun. 23, 2016, 9 pages.
State Intellectual Property of the People's Republic of China, Office Action and Search Report Issued in Application No. 201510314410.8, dated Nov. 16, 2018, 10 pages.
Taiwan Intellectual Property Office, Office Action and Search Report Issued in Application No. 104119068, dated Jan. 15, 2019, 10 pages.

\* cited by examiner

POWER SUPPLY APPARATUS OF FLUID CONTROL AND MEASUREMENT SYSTEM

TECHNICAL FIELD

The present invention relates to a power supply apparatus of a fluid control and measurement system for controlling a flow rate of a fluid such as material gas, a chemical solution, or a cleaning solution used for a semiconductor manufacturing process.

BACKGROUND ART

For example, in the case of using multiple gases as with a semiconductor process, a flow rate controller is provided for each gas line in order to control a flow rate of each of the gases. In addition, a reduction in size of such a flow rate controller is increasingly demanded, and therefore a method that supplies power from a power supply apparatus, which is adapted to comprehensively manage respective flow rate controllers, via a communication cable without incorporating a power source device in any of the flow rate controllers is also used.

Meanwhile, in general, at the time of start-up, inrush current larger than current at the time of normal operation flows through a power supply line, and therefore it is necessary to equip a power supply apparatus with a power source device having sufficiently large current capacity.

However, as the number of flow rate controllers is increased, overall inrush current also increases correspondingly, and consequently the size of a power source device is increases. Also, for example, in a semiconductor process system, a reduction in size of a power supply apparatus may also be required. However, an increase in size of a power source of the power supply apparatus may give rise to the problem of being unable to fulfill the requirement.

CITATION LIST

Patent Literature

Patent Literature 1: International Publication WO2008/069227

SUMMARY OF INVENTION

Technical Problem

The present invention is made in consideration of the above-described problem, and intends to prevent an increase in size of a power source device in a power supply apparatus adapted to manage multiple fluidic devices.

Solution to Problem

That is, an power supply apparatus according to the present invention is one that is connected via electric connecting lines to multiple fluidic devices, which are adapted to control or measure fluid, to supply power to the respective fluidic devices via the electric connecting lines, and the power supply apparatus includes a power supply control part that shifts power supply start timings for at least some of the fluidic devices.

In such a configuration, since the power supply control part shifts power supply start timings for at least some of the fluidic devices, for example, inrush current flowing from a power source of the power supply apparatus to each of the fluidic devices at the time of start-up can be temporally decentralized. For this reason, the need to increase current capacity of the power source correspondingly to the number of fluidic devices as before can be eliminated, and consequently the power supply apparatus can be reduced in size and weight by a significant reduction in size of the power source on the power supply apparatus side.

In order for the power supply control part to surely supply the power to electric connecting lines connected to corresponding fluidic devices among the multiple electric connecting lines, it is preferable that the power supply control part further includes a power supply/shutoff part that turns on/off the power supply to each of the fluidic devices, and an electric connecting line disconnection/connection monitoring part that monitors the disconnection/connection of each of the electric connecting lines to the respective fluidic devices; and the electric connecting line disconnection/connection monitoring part transmits an ON/OFF control signal to the power supply/shutoff part to supply the power to a power supply line for an electric connecting line of which the connection is sensed.

Note that in the case where voltage is generated in a cable disconnected from a corresponding fluidic device, if the cable is connected to the fluidic device, overcurrent or overvoltage caused by LC resonance acts on the fluidic device at the time of the connection, and the fluidic device may be damaged.

In order to prevent damage due to unexpected insertion/removal or breaking of a cable, it is preferable that the electric connecting line disconnection/connection monitoring part transmits the ON/OFF control signal to the power supply/shutoff part to stop the power supply to a power supply line for an electric connecting line of which the disconnection is sensed.

The above-described configuration makes it possible to prevent voltage from being generated in a power supply line for a cable disconnected from a corresponding fluidic device, and therefore even if the cable is connected to the fluidic device, suppress overcurrent or overvoltage from being applied to the fluidic device, thus making it difficult to damage the fluidic device.

Also, even in the case where a disconnected cable is attached with dirt and dust, or connected to a wrong terminal, voltage is not generated in a power supply line for the cable, and therefore a failure such as a short circuit, overcurrent, or overvoltage can be prevented.

In order to minimize inrush current, it is preferable that the power supply control part is configured to shift all power supply start timings for the respective fluidic devices.

Specific embodiments can include one where the power supply control part further includes a power supply start timing setting part that sets power supply start timings for the respective fluidic devices.

Specific embodiments of the power supply start timing setting part can include one where the power supply start timing setting part receives a predetermined power supply start signal, and determines the power supply start timings for the respective fluidic devices with timing of the reception as a reference.

Advantageous Effects of Invention

The present invention configured as described can prevent an increase in size of a power source device in a power supply apparatus adapted to manage multiple flow rate controllers.

DESCRIPTION OF EMBODIMENTS

A fluid control and measurement system according to one embodiment of the present invention is described with reference to FIGS. 1 to 4.

Figure 1:
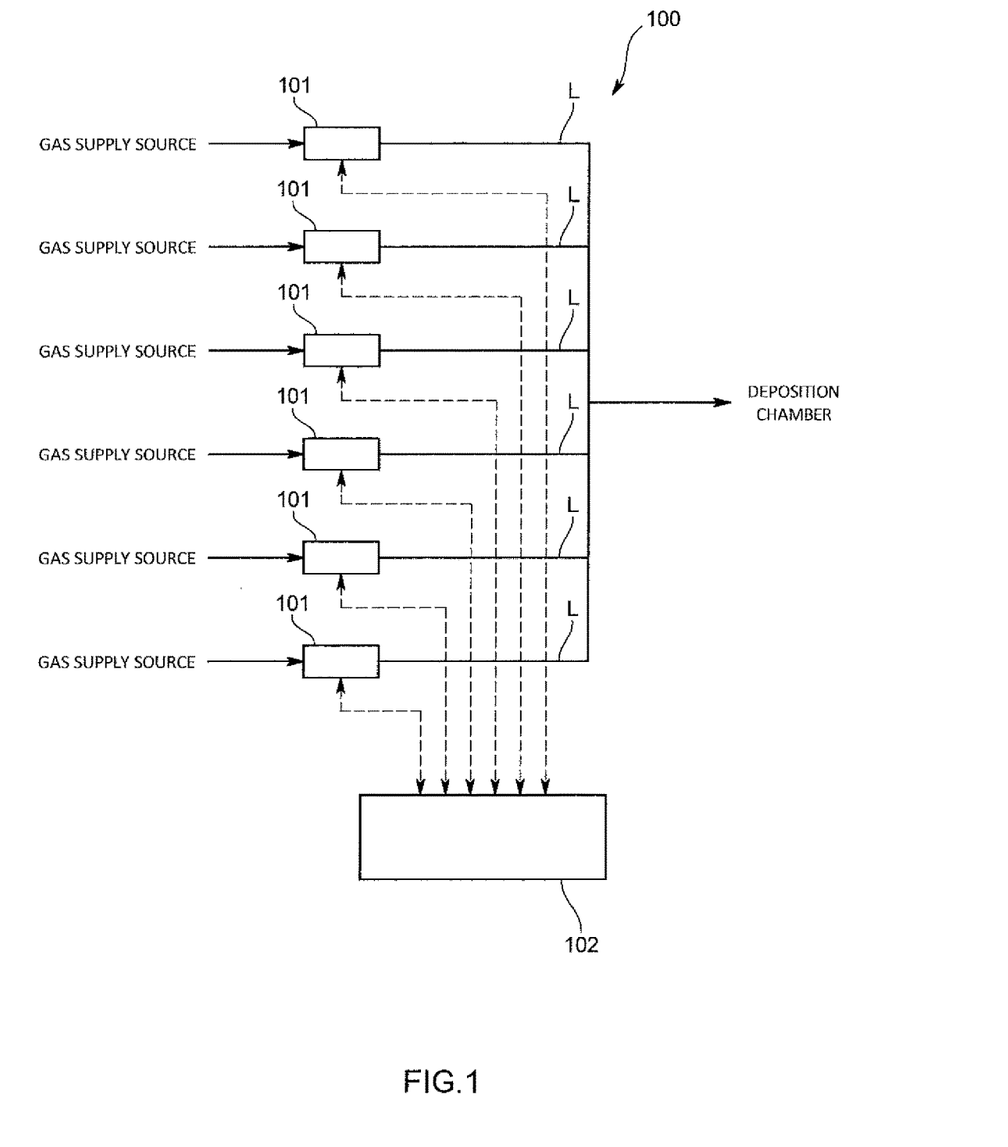
FIG. 1 is a diagram schematically illustrating an overview of a fluid control and measurement system according to one embodiment of the present invention.

As illustrated in FIG. 1, the fluid control and measurement system 100 is one that is used for, for example, introducing various gases for semiconductor manufacturing system deposition respectively from gas supply sources, and mixing them to supply the mixture to a semiconductor deposition chamber (not illustrated). Also, the fluid control and measurement system 100 includes: a flow path forming member that forms flow paths L (hereinafter also referred to as gas flow paths) for the respective gases; a flow rate controller 101 as a fluidic device that is provided in each gas flow path L to independently control a flow rate of gas flowing through the gas flow path L; and a power supply apparatus 102 that comprehensively manages operations of the respective flow rate controllers 101.

Note that fluidic devices include, for example, a fluid controller adapted to control a physical property of fluid such as pressure, flow rate, or temperature-dependent viscosity, and a fluid measurement device adapted to measure the physical property.

Next, respective parts of the fluid control and measurement system 100 are specifically described.

The flow path forming member is configured on a panel by, for example, consecutively providing multiple block bodies planarly although not illustrated. Each of the block bodies includes an internal flow path, and by consecutively providing the block bodies to connect the internal flow paths of the respective block bodies, the multiple parallel gas flow paths L are formed. As the block bodies, various types of block bodies are prepared, such as a block body that can be equipped with a fluidic device such as a pressure sensor, a valve, or the below-described flow rate controller 101, and a block body in which a branching flow path is formed. The reason why the flow path forming member is formed of such block bodies is because the block bodies can be closely disposed, on which the fluidic devices can be integrally equipped, resulting in reduction in size, and consequently, a flow path can be shortened to reduce a dead space and improve responsiveness. Note that as the flow path forming member, a typical piping member may be used.

Figure 2:
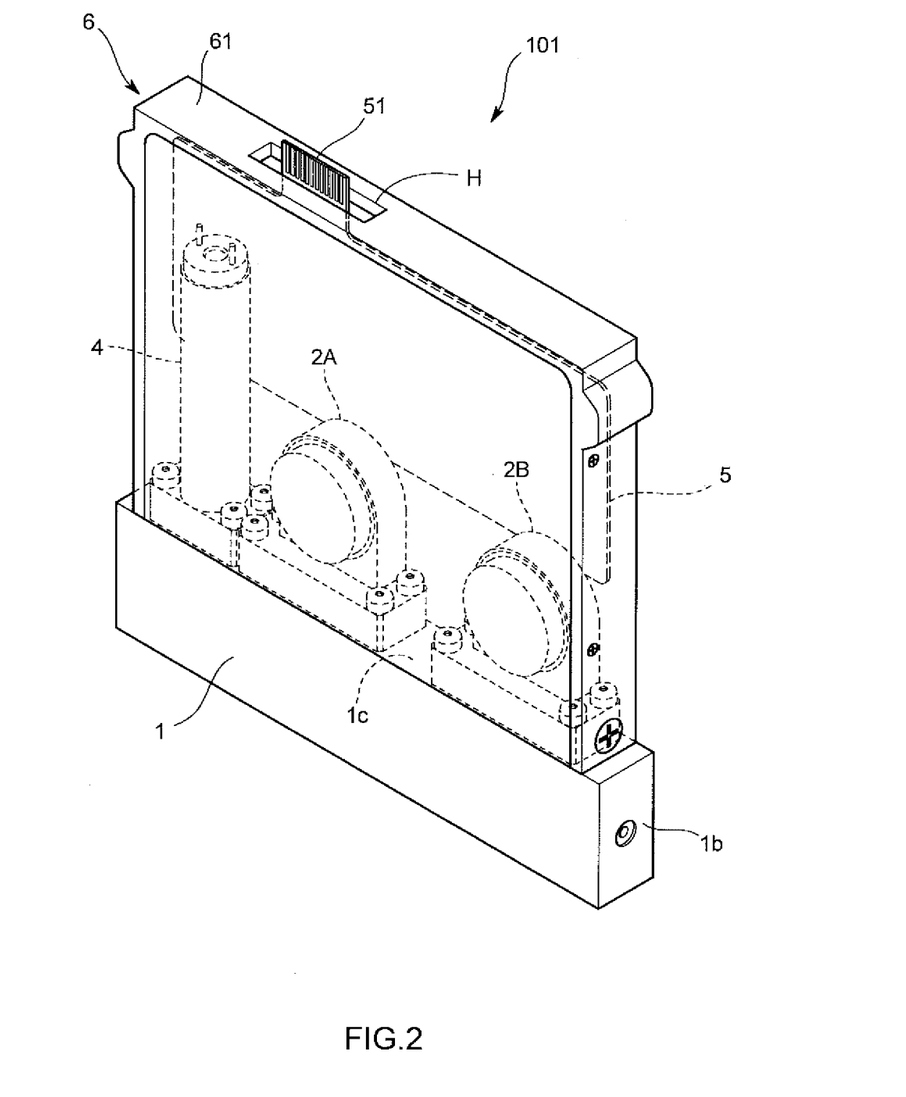
FIG. 2 is a perspective view illustrating an overview of a flow rate controller in the same embodiment.
Figure 3:
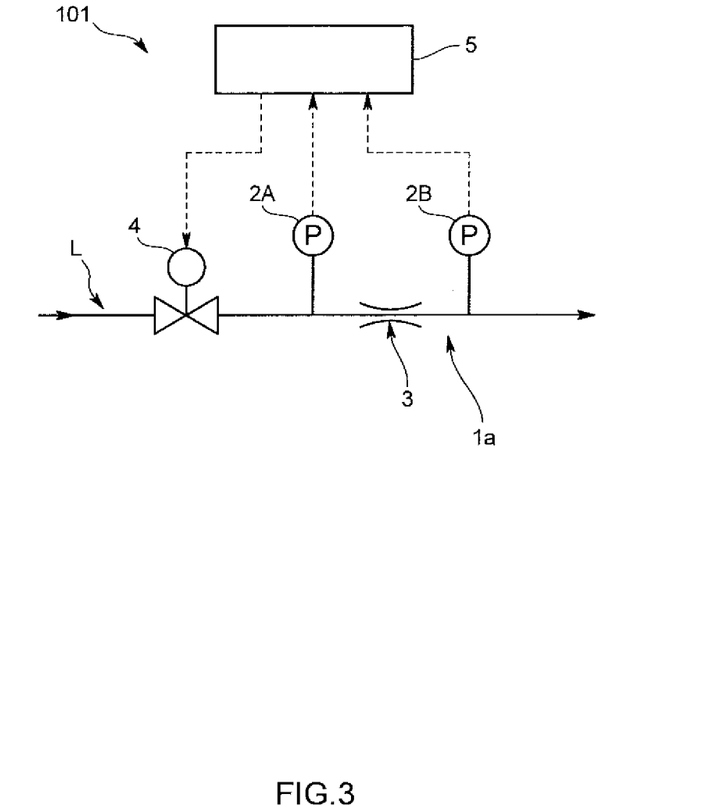
FIG. 3 is a diagram schematically illustrating the flow rate controller in the same embodiment.

The flow rate controller 101 is one that as illustrated in FIGS. 2 and 3, includes: pressure sensors 2A and 2B, a fluid resistance element 3, a flow rate adjustment valve 4, and an electric circuit board 5, with which a block body 1 for equipping a flow rate controller (hereinafter also simply referred to as a block body) is equipped; and a cover body 6 that contains them.

The block body 1 is of an elongated rectangular parallelepiped shape, and in front and rear end surfaces 1b formed orthogonal to the longer direction of the block body 1, a gas introduction port and a gas lead-out port are respectively provided. Further, in the block body 1, an internal flow path 1a through which gas flows along the longer direction in a plan view is formed so as to connect the respective ports to each other.

In addition, in the internal flow path 1a, the flow rate adjustment valve 4, first pressure sensor 2A, fluid resistance element 3, and second pressure sensor 2B are provided sequentially from an upstream side. Also, on the upper surface 1c of the block body 1 (i.e., a surface that is parallel to the longer direction of the block body 1 and orthogonal to the end surfaces 1b) is set as a part attachment surface, and on the part attachment surface, the below-described housings of the flow rate adjustment valve 4 and the pressure sensors 2A and 2B are provided.

The flow rate adjustment valve 4 is one that includes a valve body (not illustrated) provided in the internal flow path 1a, and an actuator (not illustrated) adapted to open/close the valve body. The actuator is one that uses, for example, a stacked piezo element that is expandable/contractable in its thickness direction, and contained in the housing of a tubular shape attached on the part attachment surface. In addition, a valve opening level of the valve body is adapted to be adjustable by expanding or contracting the actuator.

Each of the pressure sensors 2A and 2B is one that includes the housing of a flat shape and a pressure sensing element incorporated in the housing. In addition, the housing is attached on the part attachment surface 1c such that a face plate part (flat surface) of the housing is vertical to the part attachment surface and parallel to the longer direction of the block body 1, i.e., the face plate part is substantially parallel to a flow direction of fluid in a plan view.

The fluid resistance element 3 is one that forms a narrow passage part provided in the internal flow path 1a, and in this embodiment, embedded inside the block body 1.

The electric circuit board 5 is one that is raised vertically to the part attachment surface 1c of the block body 1 and parallel to the longer direction of the block body 1. In the present embodiment, the electric circuit board 5 is provided such that a connector 51 as a part of the electric circuit board 5 extends outward through a through-hole H of, for example, a rectangular shape formed in an upper plate part 61 of the cover body 6. Note that the connector 51 may be a mounted-type connector.

On the electric circuit board 5, digital circuits such as a CPU, a memory, and a communication circuit, and analog circuits such as an amplifier and a buffer are formed.

Figure 4:
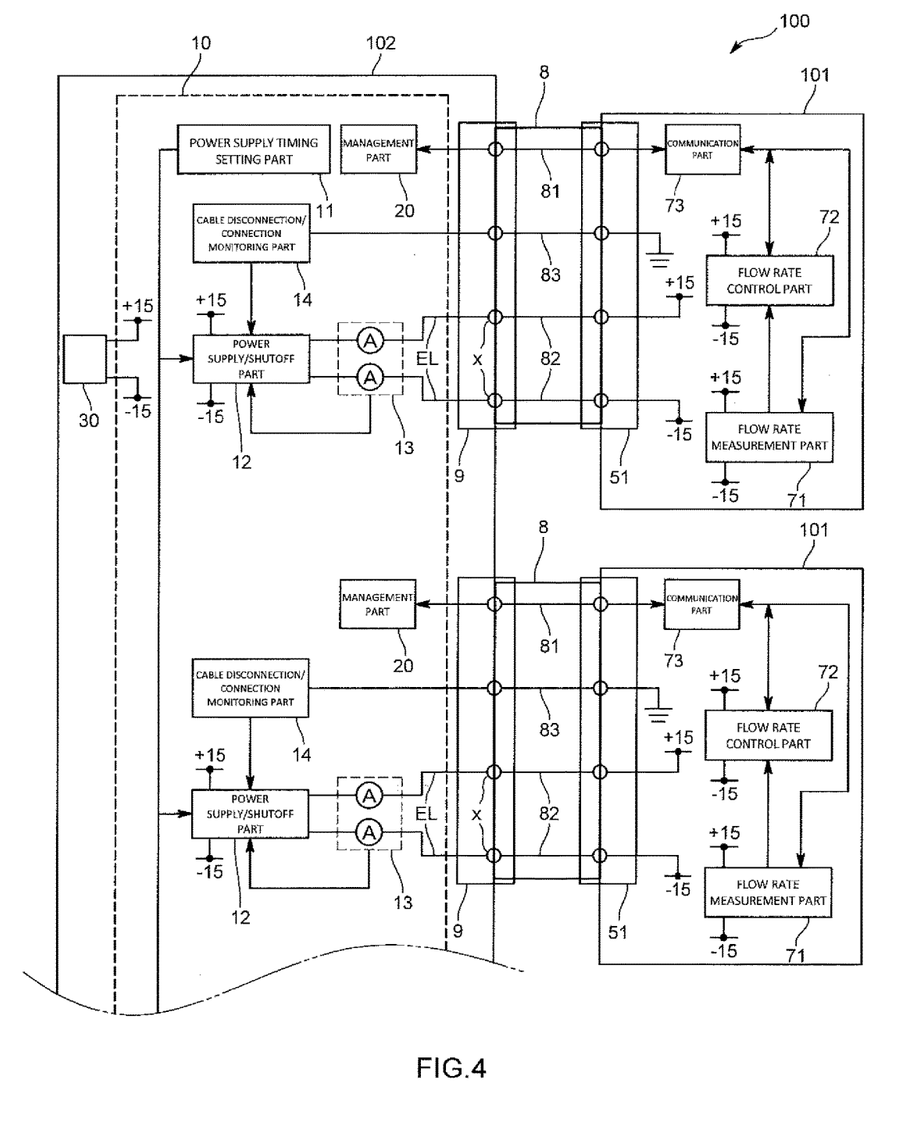
FIG. 4 is a functional block diagram illustrating flow rate controllers and a power supply apparatus in the same embodiment.

Further, as illustrated in FIG. 4, the respective circuits cooperate, and thereby in functional terms, the electric circuit board 5 fulfills functions as: a flow rate measurement part 71 that measures a flow rate of gas flowing through the gas flow path L (a gas flow path as the internal flow path 1a of the block body 1); and a flow rate control part 72 that controls the gas flow rate sensed by the flow rate measurement part 71 to a predetermined target flow rate.

The flow rate measurement part 71 is one that calculates the flow rate of the gas flowing through the gas flow path L on the basis of pressures in the gas flow path L measured by the pressure sensors 2A and 2B provided upstream and downstream of the fluid resistance element 3, respectively. The gas flow rate (hereinafter also referred to as a measured flow rate) calculated in this manner is outputted to the flow rate control part 72 as a measurement signal.

The flow rate control part 72 is one that receives a target flow rate signal and the measurement signal, compares the target flow rate and the measured flow rate respectively indicated by the signals, and outputs an operation signal for driving the flow rate adjustment valve 4 so as to minimize the deviation between the target flow rate and the measured flow rate. In addition, the flow rate control part 72 is adapted to receive a valve open/close signal as well, and upon receipt of the valve open/close signal, forcibly fully opens or fully closes the flow rate adjustment valve 4 regardless of a value of the target flow rate signal.

Note that in the present embodiment, the flow rate measurement part 71 and the flow rate control part 72 are configured to transceive the above-described various signals with the power supply apparatus via a communication part 73.

Next, the power supply apparatus 102 is described.

The power supply apparatus 102 is an information processor including a CPU, a memory, an I/O port, and the like. In addition, the CPU and its peripheral devices cooperate in accordance with a program stored in the memory, and thereby the power supply apparatus 102 at least fulfills a function as a management part 20 that communicates with the communication parts 73 of the respective flow rate controllers 101 via electric cables 8 as electric connecting lines to manage the flow rate controllers 101. Signals transmitted from the power supply apparatus 102 to each of the flow rate controllers 101 via a corresponding electric cable 8 include, in addition to the target flow rate signal indicating a target flow rate, the valve open/close signal for forcibly opening/closing a corresponding flow rate adjustment valve 4, and the like. On the other hand, signals transmitted from each of the flow rate controllers 101 to the power supply apparatus 102 include the measurement signal indicating a measured flow rate, measured pressure signals indicating pressures measured by respective corresponding pressure sensors, a valve opening level signal indicating an opening level of a corresponding flow rate adjustment valve 4 (voltage applied to the valve 4), and the like.

Meanwhile, the fluid control and measurement system 100 of the present embodiment is configured such that a power source (more specifically, a DC power source adapted to generate, for example, ±15 V) adapted to supply power to the electric circuits is not provided in any of the above-described flow rate controllers 101, but the power is supplied from a DC power source 30 provided in the power supply apparatus 102 via the electric cables 8.

For this reason, as illustrated in FIG. 4, each of the electric cables 8 includes multiple lines such as, in addition to a communication line 81, power supply lines 82 connected to the DC power source 30, and also the power supply apparatus 102 further includes a power supply control part 10 for controlling the power to be supplied to the respective flow rate controllers 101. In addition, in FIG. 4, numerals 51 and 9 indicate electric cable connecting connectors that are respectively provided for each of the flow rate controllers 101 and for the power supply apparatus 102.

Next, the power supply control part 10 is described in detail. As illustrated in FIG. 4, the power supply control part 10 includes power supply/shutoff parts 12, a power supply timing setting part 11, current measurement parts 13, and electric connecting line disconnection monitoring parts 14 (hereinafter also referred to as cable disconnection/connection monitoring parts).

Each of the power supply/shutoff parts 12 is provided between corresponding power lines EL (±15 V lines here) between the DC power source 30 and the power supply lines 82, and specifically, configured to mainly include a semiconductor switching element (not illustrated) such as an FET capable of making a disconnection/connection between the power lines EL. In addition, the power lines EL are connected to the power supply lines 82 of the electric cable 8 via the connector 9, and enable the power to be supplied to the flow rate controller 101.

The above-described configuration makes it possible to control the responsiveness of each semiconductor switching element such as an FET, and therefore for example, by inputting a capacitor component to a control terminal of the semiconductor switching element to slow the responsiveness, LC resonance that may occur when a corresponding electric cable 8 is connected can be controlled.

The power supply timing setting part 11 is one that receives a power supply start signal inputted by, for example, an operator using unillustrated input means, and in order to supply the power to the multiple flow rate controllers 101 in predetermined order with timing of the reception as a reference, transmits an ON/OFF control signal to the respective power supply/shutoff parts 12 to set power supply start timings for the respective flow rate controllers 101. Note that the ON/OFF control signal refers to, for example, a binary signal applied to a control terminal (gate or base) of each of the switching elements.

More specifically, for example, on the basis of order data preliminarily stored in the memory, the power supply start timings are set such that the power is supplied to the respective flow rate controllers 101 in order of priority while equally shifting each of the power supply start timings by a predetermined time (e.g., 2 msec or more to 10 sec or less).

Each of the power supply/shutoff parts 12 is one that is provided between corresponding power lines EL for each of the flow rate controllers 101, and supplies the predetermined power between the power supply lines 82 of the electric cable 8 connected to the flow rate controller 101, or shuts off the power, respectively.

Each of the current measurement parts 13 is one that is provided between corresponding power lines EL for each of the flow rate controllers 101, and measures current flowing from the power supply apparatus 102 to the flow rate controller 101.

Specifically, the current measurement part 13 is one having, for example, a current detecting element, and in the present embodiment, configured to, in the case where the measured current is equal to or larger than a predetermined value, transmit the ON/OFF control signal to the power supply/shutoff part 12 to switch, for example, the semiconductor switching element (not illustrated), and shut off the power supplied between the power supply lines 82, i.e., voltage generated between electric terminals x that are provided for the connector 9 and respectively connected with the power supply lines 82.

Each of the cable disconnection/connection monitoring parts 14 is one that is provided for each of the flow rate controllers 101, and monitors whether the electric cable 8 connected to the corresponding flow rate controller 101 is disconnected or connected. In the present embodiment, the cable disconnection/connection monitoring part 14 monitors the disconnection/connection between the electric cable 8, and the flow rate controller 101 or the power supply apparatus 102.

Note that the disconnection/connection of the electric cable 8 refers to a state where the electric cable 8 is connected to the controller or the apparatus, or a state where the electric cable 8 is disconnected from the controller or the apparatus, and as the disconnection state, a state where the electric cable 8 breaks in the middle is also included, in addition to a state where the electric cable 8 is removed from the controller or the apparatus.

Specifically, the cable disconnection/connection monitoring part 14 is connected to a disconnection/connection monitoring line 83 provided in the electric cable 8 separately from the above-described communication line 81 and power supply lines 82, and configured to monitor the above-described disconnection/connection by, for example, determining whether or not current flows through the disconnection/connection monitoring line 83.

The cable disconnection/connection monitoring part 14 of the present embodiment is configured to, when sensing the state where the electric cable 8 is disconnected from the flow rate controller 101 or the power supply apparatus 102, i.e., the state where no current flows through the disconnection/connection monitoring line 83, transmit the ON/OFF control signal to the power supply/shutoff part 12 to switch, for example, the semiconductor switching element (not illustrated), and shut off the power supplied between the power supply lines 82, i.e., the voltage generated between the above-described electric terminals x.

Next, the operation of the fluid control and measurement system 100 of the present embodiment is described.

First, when the power supply start signal is inputted by, for example, an operator in a state where all the flow rate controllers 101 are connected to the power supply apparatus 102 through the corresponding electric cables 8, the power supply timing setting part 11 receives the power supply start signal.

Then, in order to supply the power to the respective flow rate controllers 101 in the predetermined order with timing of the reception as a reference, the power supply timing setting part 11 transmits the ON/OFF control signal to the respective power supply/shutoff parts 12 with timing of the reception as a reference.

Note that the power supply timing setting part 11 is not necessarily required to use the timing of the reception as a reference, but may use as a reference, for example, timing when all the flow rate controllers 101 are connected to the power supply apparatus 102 via the corresponding electric cables 8, or timing when the power supply apparatus 102 is turned on.

In the present embodiment, after the power has been supplied to the respective flow rate controllers 101 as described above, each of the cable disconnection/connection monitoring parts 14 monitors the disconnection/connection of a corresponding electric cable 8 at predetermined time intervals.

When sensing the disconnection of the electric cable 8, the cable disconnection/connection monitoring part 14 transmits the ON/OFF control signal to the power supply/shutoff part 12 in order to shut off the power to the electric cable 8.

After that, when the disconnected electric cable 8 is again connected by, for example, an operator, the cable disconnection/connection monitoring part 14 transmits the ON/OFF control signal to the power supply/shutoff part 12 to supply the power to the electric cable 8. When doing this, the cable disconnection/connection monitoring part 14 may transmit the ON/OFF control signal to the power supply/shutoff part 12 after a predetermined time has passed since the connection was sensed by, for example, changing the program.

In the case where multiple disconnected electric cables 8 are almost simultaneously connected again, the power supply timing setting part transmits the ON/OFF control signal to respective corresponding power supply/shutoff parts 12 so as to supply the power sequentially from one having the highest priority among flow rate controllers 101 corresponding to the electric cables 8.

The fluid control and measurement system 100 according to the present embodiment configured as described can temporally decentralize and minimize inrush current flowing from the DC power source 30 to each of the flow rate controllers 100 because the power supply timing setting part 11 transmits the ON/OFF control signal to the respective power supply/shutoff parts 12 to supply the power to the respective flow rate controllers 101 in the predetermined order while shifting each of the power supply start timings.

In doing so, current capacity necessary for the DC power source 30 can be kept small to eliminate the need to increase the current capacity of the DC power source 30 correspondingly to the number of flow rate controllers 101 as before, and consequently the power supply apparatus 102 can be reduced in size and weight by a significant reduction in size of the DC power source 30.

Also, when sensing the disconnection of an electric cable 8, a corresponding cable disconnection/monitoring part 14 transmits the ON/OFF control signal to the power supply/shutoff part 12 to shut off the power between the power supply lines 82 of the electric cable 8, and therefore even in the case of connecting the electric cable 8 to the flow rate controller 101, the flow rate controller 101 can be prevented from being damaged by overvoltage or overcurrent.

Further, even in the case where a disconnected electric cable 8 is attached with dirt and dust, or connected to a wrong connector, the power is not supplied between the power supply lines 82 of the electric cable 8, and therefore a failure such as a short circuit, overvoltage, or overcurrent can be prevented.

In addition, by configuring various sequences, supply timing can be variously changed, such as starting to supply the power of +15 V to a flow rate controller 101 and then after 10 msec, supplying the power of −15 V.

Note that the present invention is not limited to the above-described embodiment.

For example, in the above-described embodiment, the power supply timing setting part supplies the power to the respective flow rate controllers in the predetermined order, but may supply the power to the respective flow rate controllers in the order, for example, the electric cables are connected to the corresponding flow rate controllers.

Further, the power supply timing setting part may be configured to supply the power to the respective flow rate controllers in the order, for example, the valves provided corresponding to the respective flow rate controllers are opened, or fluids are supplied to chambers provided corresponding to the respective flow rate controllers.

Also, the power supply timing setting part in the above-described embodiment is configured to shift all the power supply start timings for the respective flow rate controllers, but may be configured to shift power supply start timings for some of the flow rate controllers.

Further, each of the cable disconnection/connection monitoring parts in the above-described embodiment is configured to monitor the disconnection/connection of a corresponding electric cable by determining whether or not the current flows through the disconnection/connection monitoring line, but may be configured to monitor the disconnection/connection of the electric cable by, for example, determining whether or not current flows through the communication line or between the power supply lines, or by other means.

In addition, specific embodiments configured to determine whether or not the current flows through each of the above-described disconnection/connection monitoring and communication lines or between the power supply lines include an embodiment configured such that the cable disconnection/connection monitoring part detects the current of each of the lines in a state of being insulated from each of the lines using a photo coupler, or the cable disconnection/connection monitoring part detects the current of each of the lines using a current detecting element or the like.

In addition, the above-described embodiment is configured to, when an electric cable is disconnected, shut off the power to the electric cable, but may be configured to, when an electric cable is disconnected, shut off the power to all the other electric cables.

In this case, it is only necessary that the cable disconnection/connection monitoring part is configured to, when sensing the disconnection of the electric cable, transmit the ON/OFF control signal to the power supply/shutoff part in order to shut off the power to the electric cable, as well as transmitting the ON/OFF control signal to the power supply/shutoff parts corresponding to the other electric cables.

Further, as the connector included in each of the flow rate controllers, one compatible with hot plugging may be used. In this case, by allocating Power and COM to electric terminals (side pins) positioned at both ends of the connector, when a corresponding electric cable is unplugged, inner electric terminals are unplugged first before the electric terminals on the both sides are unplugged.

In doing so, the cable disconnection/connection monitoring part can detect the disconnection/connection of the disconnection/connection monitoring line to stop the power supply to the flow rate controller before the electric terminals at the both ends are unplugged.

That is, in the case of using a bipolar power source IC inside the flow rate controller, a single-sided power supply state can be suppressed.

Also, in the above-described embodiment, each of the flow rate controllers and the power supply apparatus are connected to each other via a corresponding electric cable, but may be connected to each other directly via the connectors thereof without using the electric cable.

In addition, each of the flow rate controllers is of a so-called differential pressure type, but may be of a thermal type.

Further, a flow rate controller may include a power supply timing setting part, a power supply/shutoff part, and a cable disconnection/connection monitoring part. However, providing the power supply timing setting part, the power supply/shutoff parts, and the cable disconnection/connection monitoring parts in the power supply apparatus as in the above-described embodiment is more advantageous in reducing the size of each of the flow rate controllers.

Besides, various modifications and embodiments may be combined without departing from the scope of the present invention.

REFERENCE SIGNS LIST

100: Fluid control and measurement system
101: Flow rate controller
102: Power supply apparatus
5: Electric circuit board
8: Electric cable
81: Communication line
82: Power supply line
83: Disconnection/connection monitoring line
10: Power supply control part
11: Power supply timing setting part
12: Power supply/shutoff part
13: Current measurement part
14: Cable disconnection/connection monitoring part

The invention claimed is:

1. A power supply apparatus, comprising:
a power supply control part configured to start supplying power via at least one of a plurality of power supply lines to at least one fluidic device of a plurality of fluidic devices at a first start timing and start supplying power to at least another fluidic device of the plurality of fluidic devices at a second start timing which is different from the first start timing, wherein:
the plurality of fluidic devices are each adapted to control or measure fluid;
the power supply apparatus is configured to supply power to a plurality of disconnection/connection monitoring lines which are provided separately from the power supply lines;
the power supply control part includes:
a management part configured to communicate with the plurality of fluidic devices via a plurality of communication lines that are provided separately from the power supply lines and the disconnection/connection monitoring lines;
a power supply/shutoff part configured to turn on/off the power supply to each of the plurality of fluidic devices; and
an electric connecting line disconnection/connection monitoring part configured to monitor disconnection/connection of each of the respective fluidic devices at least in part by determining whether current flows through the respective disconnection/connection monitoring lines; and
the electric connecting line disconnection/connection monitoring part is further configured to transmit an ON/OFF control signal to the power supply/shutoff part to supply power to the power supply line, the connection of which is detected.

2. The power supply apparatus according to claim 1, wherein
the electric connecting line disconnection/connection monitoring part transmits the ON/OFF control signal to the power supply/shutoff part to shutoff power supply to the power supply line, the disconnection of which is detected.

3. The power supply apparatus according to claim 1, wherein
the power supply control part is configured to shift all power supply start timings for the respective fluidic devices.

4. The power supply apparatus according to claim 1, wherein
the power supply control part further comprises a power supply start timing setting part that sets power supply start timings for the respective fluidic devices.

5. The power supply apparatus according to claim 4, wherein
the power supply start timing setting part receives a predetermined power supply start signal, and determines the power supply start timings with timing of the reception as a reference.

6. The power supply apparatus according to claim 1, wherein the power supply control part is configured to shift all other power supply start timings for all other respective fluidic devices of the multiple fluidic devices following the first start timing at which supplying power is started for the at least one fluidic device.

7. The power supply apparatus of claim 6, wherein the multiple fluidic devices include at least three fluidic devices.

\* \* \* \* \*